United States Patent
Raghunathan et al.

(10) Patent No.: US 10,932,122 B1
(45) Date of Patent: Feb. 23, 2021

(54) USER EQUIPMENT BEAM EFFECTIVENESS

(71) Applicant: Sprint Communications Company L.P., Overland Park, KS (US)

(72) Inventors: Sathyanarayanan Raghunathan, Herndon, VA (US); Muthukumaraswamy Sekar, Herndon, VA (US); Maheswaran Vijayakumar, Herndon, VA (US); Suresh Majjara, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 63 days.

(21) Appl. No.: 16/434,489

(22) Filed: Jun. 7, 2019

(51) Int. Cl.
| | |
|---|---|
| *H04W 4/00* | (2018.01) |
| *H04W 8/08* | (2009.01) |
| *H04W 72/04* | (2009.01) |
| *H04W 4/029* | (2018.01) |
| *H04B 7/01* | (2006.01) |
| *H04W 4/02* | (2018.01) |
| *H04L 5/00* | (2006.01) |

(52) U.S. Cl.
CPC ............... *H04W 8/08* (2013.01); *H04B 7/01* (2013.01); *H04L 5/0051* (2013.01); *H04W 4/027* (2013.01); *H04W 4/029* (2018.02); *H04W 72/046* (2013.01)

(58) Field of Classification Search
CPC ....... H04W 8/08; H04W 4/029; H04W 4/027; H04W 72/046; H04W 5/0051; H04B 7/01
USPC ......... 370/329–333, 335–345; 375/224–236, 375/295–337
See application file for complete search history.

(56) References Cited

U.S. PATENT DOCUMENTS

| | | | |
|---|---|---|---|
| 10,109,284 B2* | 10/2018 | Atti | G10L 19/0204 |
| 10,395,662 B2* | 8/2019 | Atti | G10L 19/008 |
| 2017/0178635 A1* | 6/2017 | Atti | G10L 19/005 |
| 2017/0270934 A1* | 9/2017 | Atti | G10L 19/008 |
| 2017/0270935 A1* | 9/2017 | Atti | G10L 19/24 |
| 2018/0122385 A1* | 5/2018 | Chebiyyam | H04S 1/007 |
| 2018/0268828 A1* | 9/2018 | Atti | G10L 19/005 |
| 2020/0142068 A1* | 5/2020 | Crouch | G01S 17/42 |

* cited by examiner

*Primary Examiner* — Thai D Hoang

(57) ABSTRACT

Systems and methods are provided for improving user equipment (UE) beam effectiveness for a high mobility user. The system calculates at least one shift value for a UE based on a reference signal transmitted by the UE. When it is determined that the at least one shift value for the UE is greater than a predetermined threshold, the system will analyze at least past shift value. Based on this analysis, the system will predict a future shift value for the first UE beam. Then, instruction are provided for the modification of one or more of a first UE beam or a second UE beam.

20 Claims, 8 Drawing Sheets

USER EQUIPMENT BEAM EFFECTIVENESS

TECHNICAL FIELD

The present invention relates to the use of predictive beamforming based on past shift values to improve user equipment beam effectiveness, substantially as shown in and/or described in connection with at least one of the figures, and as set forth more completely in the claims.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods for dynamically improving user equipment (UE) beam effectiveness for a high mobility UE are disclosed. As wireless technology advances, utilizing Massive MIMO for wireless communication sessions on different communication protocols (e.g. 5G/4G) has become more prevalent and can improve the user experience, while being more efficient due to the Massive MIMO system design. Massive MIMO uses 3D beamforming to create narrow UE beams that have higher power and cause less interference with other UE specific beams. Massive MIMO also utilizes a larger number of antenna rays at a base station to simultaneously serve many autonomous terminals, resulting in greater capacity. However, the quality of UE feedback using Massive MIMO varies depending on whether the UE is stationary or mobile, with more reliable UE feedback when the UE is stationary or when the signal variation is minimal. As such, when a UE is highly mobile, it results in poor UE feedback thereby decreasing beamforming effectiveness. Additionally, when Massive MIMO is utilized with a high mobility user, the signal variation is high, resulting in large shift values. The large shift values and poor UE feedback leads to poor assignment of a UE beam, which may then decrease performance improvement or cause degradation. In other words, when a high mobility UE is present, the narrow beams of the Massive MIMO do not adequately cover the UE, resulting in minimal or no improvement with the use of Massive MIMO and decreased beamforming effectiveness. The present system addresses this problem by utilizing predictive beamforming based on past shift values to either create a new, second, UE specific beam or adjust the beamwidth of a first UE beam in order cover a highly mobile UE.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
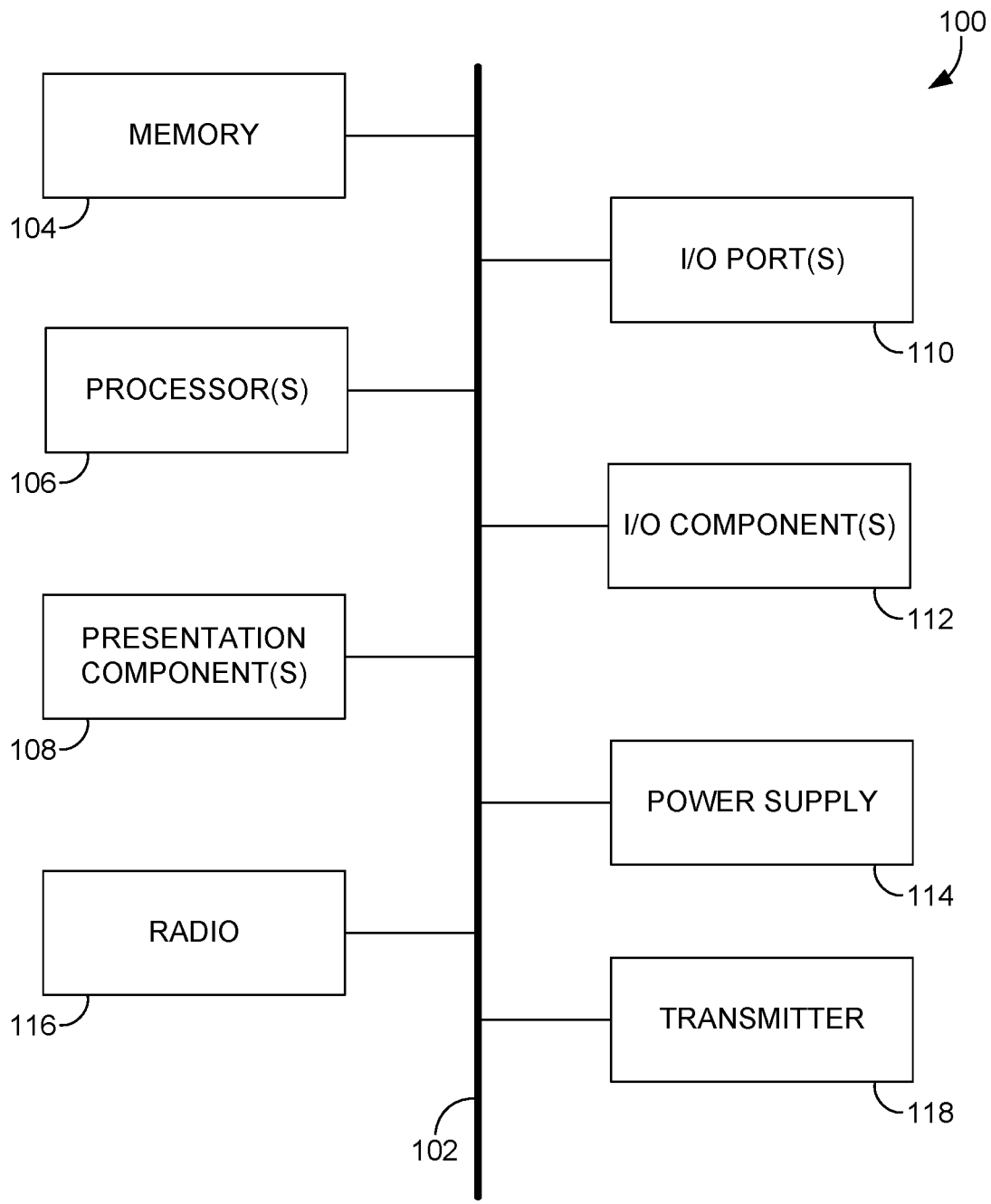
FIG. 1 depicts a diagram of an exemplary computing environment suitable for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless connection device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As employed herein, user equipment (UE) (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

In aspects, a UE provides location and channel quality information to the wireless communication network via the access point. Location information may be based on a current or last known position utilizing GPS or other satellite location services, terrestrial triangulation, an access point's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the access point or at the individual antenna array of the access point 0. In other aspects, the processing of said information may be done remotely.

Generally speaking, many modern UEs comprise at least two transmitters; in some configurations, a UEs may operate using dual connectivity. That is, the UE may use at least a first of its transmitters to communicate a first uplink signal to a first node at an access point and at least a second of its transmitters to communicate a second uplink signal to a second node at the access point. In other configurations, a UE may operate using single connectivity, wherein it uses one or more of its transmitters to communicate with a single access point, base station, or cell site at one or more nodes. Whether using dual connectivity or single connectivity, a UE may have a pre-set maximum total uplink power (as will be discussed in greater detail below). Conventionally, a communication session between a UE and an access point comprises an uplink handshake, wherein the uplink handshake is an uplink signal from the UE to an access point, conventionally transmitted at the pre-set maximum uplink power. Once the handshake occurs, the network and/or the device may determine that the uplink power may be reduced (e.g., if, based on proximity or line of sight, it is determined that only half of the maximum pre-set uplink power is necessary to effectively propagate the uplink signal to the access point). The opposite, UE may not increase the power of the transmission (it may retry again later or attempt to connect to a different access point, for example).

Generally, conventional antennas may either have a fixed beam pattern or may only be capable of dynamically varying the horizontal radiation pattern of a beamform. In a fixed pattern antenna, the antenna beam patterns are fixed once the antenna is installed at a base station. While the direction of a beam can be modified manually or with antenna motors, the transmission beam emitted by the antenna is generally of a fixed shape and distance. Some antennas, or antenna arrays, are capable of dynamically varying the horizontal radiation pattern of a beamform. For example, a conventional cell site may comprise two or more columns of antennas, each column having its own power supply. By adjusting the power supply to one or more columns, the horizontal radiation pattern of the beamform may be adjusted—but not the vertical radiation pattern. A full dimension multiple input multiple output (FD-MIMO) antenna (also known as Massive MIMO, or active antenna array), on the other hand, can generate a more focused beam that is directed to one or more devices within a general vicinity of the antenna. A FD-MIMO base station can include multiple antennas and transmitters that broadcast, transmit and receive transmissions. With FD-MIMO technology, a base station can form a beam in both horizontal and vertical directions so that the transmission of a signal can be more focused and directed to a particular area and location within its transmission range.

Beamforming is conventionally employed to provide a directional data transmission to a specific user device, so that data on a traffic channel or data plane can be sent to that specific user device. However, beamforming has typically been employed to provide data to that specific user device and not to a group of user devices located within a given sector. Moreover, beamforming has either been done via actuators that change the physical orientation of an antenna (or antenna array), or when done without physical means, only horizontally beamformed. Being able to provide a system for varying power supplies to dynamically modify the 3D beamform of an antenna array provides a variety of technical benefits, including benefits for users. On the network side, more network efficiencies are realized when the beam emitted from an antenna is capturing the most users, and on the flip side, those users are provided with a better overall experience.

The present disclosure is directed to systems, methods, and computer readable media that provide an improvement to current UE beam effectiveness when using Massive MIMO. A first aspect of the present disclosure is directed to a system for improving UE beam effectiveness when using Massive MIMO for a highly mobile UE. The system comprises one or more processors and one or more computer storage hardware devices storing computer-usable instructions. In accordance with aspects described herein, the one or more processors calculate a shift value for a UE based on a received reference signal transmitted by the UE. As described herein, the shift value may be a Doppler shift value, speed, velocity or any other value that describes a measurement of movement for the UE. The system predetermines a shift value threshold and determines whether the determined shift value is meets or exceeds the shift value threshold. If the value does exceed the shift value threshold, then the system analyzes at least one past shift value for the UE. The past shift value for the UE may include any shift value (e.g. Doppler shift value) recorded in the past by the system for that specific UE. For example, the past shift value analyzed may be from milliseconds, seconds, or days prior to the current time. Based on the analysis of the at least one past shift value, the system will predict at least one future shift value for the UE. The future shift value predicted comprises the predicted subsequent movement of the UE within the next millisecond, second, minute, or any other determined time interval. Upon making the future shift value prediction, the system provides instructions to modify one or more of a first UE beam or a second UE beam. The system, predicting the future movement of the UE based on the past shift value analysis, may modify the first UE beam by adjusting the beamwidth of the first UE beam so that the first UE beam will subsequently encompass or cover the future shift value/movement location of the UE. In other aspects, the system may create a second UE beam to encompass the future shift value and movement of the UE. These steps in the present system will increase the beamforming effectiveness, decrease channel variations, and improve the overall feedback.

A second aspect of the present disclosure is directed to a method for dynamically improving user equipment (UE) beam effectiveness for a high mobility UE. The method comprises calculating at least one shift value for the UE based on a received reference signal transmitted by the UE. Then, whether at least one shift value for the UE meets or exceeds a predetermined shift value threshold is determined. In response to determining that the at least one shift value for the UE meets or exceeds the predetermined shift value threshold, at least one past shift value for the UE is analyzed. Then, at least one future shift value for the UE based on the at least one past shift value for the UE is predicted. Following this, instructions are provided to modify one or more of a first UE beam or a second UE beam.

Another aspect of the present disclosure is directed to a non-transitory computer storage media storing computer-useable instructions that, when used by one or more processors, cause the processors calculate at least one Doppler shift value for the UE based on a received reference signal transmitted by the UE. The processor determines that the at least one Doppler shift value for the UE meets or exceeds a predetermined Doppler shift value threshold. In response to determining that the at least one Doppler shift value for the UE meets or exceeds the predetermined Doppler shift value threshold, the processor then analyzes at least one past Doppler shift value for the UE, predicts at least one future Doppler shift value for the UE based on the at least one past Doppler shift value for the UE, and then provides instructions to modify one or more of a first UE beam or a second UE beam.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, power supply 114, radio 116, and transmitter 118. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built into computing device 100. Illustrative I/O components 112 include a microphone, joystick, game pad, satellite dish, scanner, printer, wireless device, etc.

The radio 116 represents one or more radios that facilitate communication with a wireless telecommunications network. While a single radio 116 is shown in FIG. 1, it is contemplated that there may be more than one radio 116 coupled to the bus 102. In aspects, the radio 116 utilizes a transmitter 118 to communicate with the wireless telecommunications network. It is expressly conceived that a computing device with more than one radio 116 could facilitate communication with the wireless telecommunications network via both the first transmitter 118 and an additional transmitters (e.g. a second transmitter). Illustrative wireless telecommunications technologies include CDMA, GPRS, TDMA, GSM, and the like. The radio 116 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 120 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
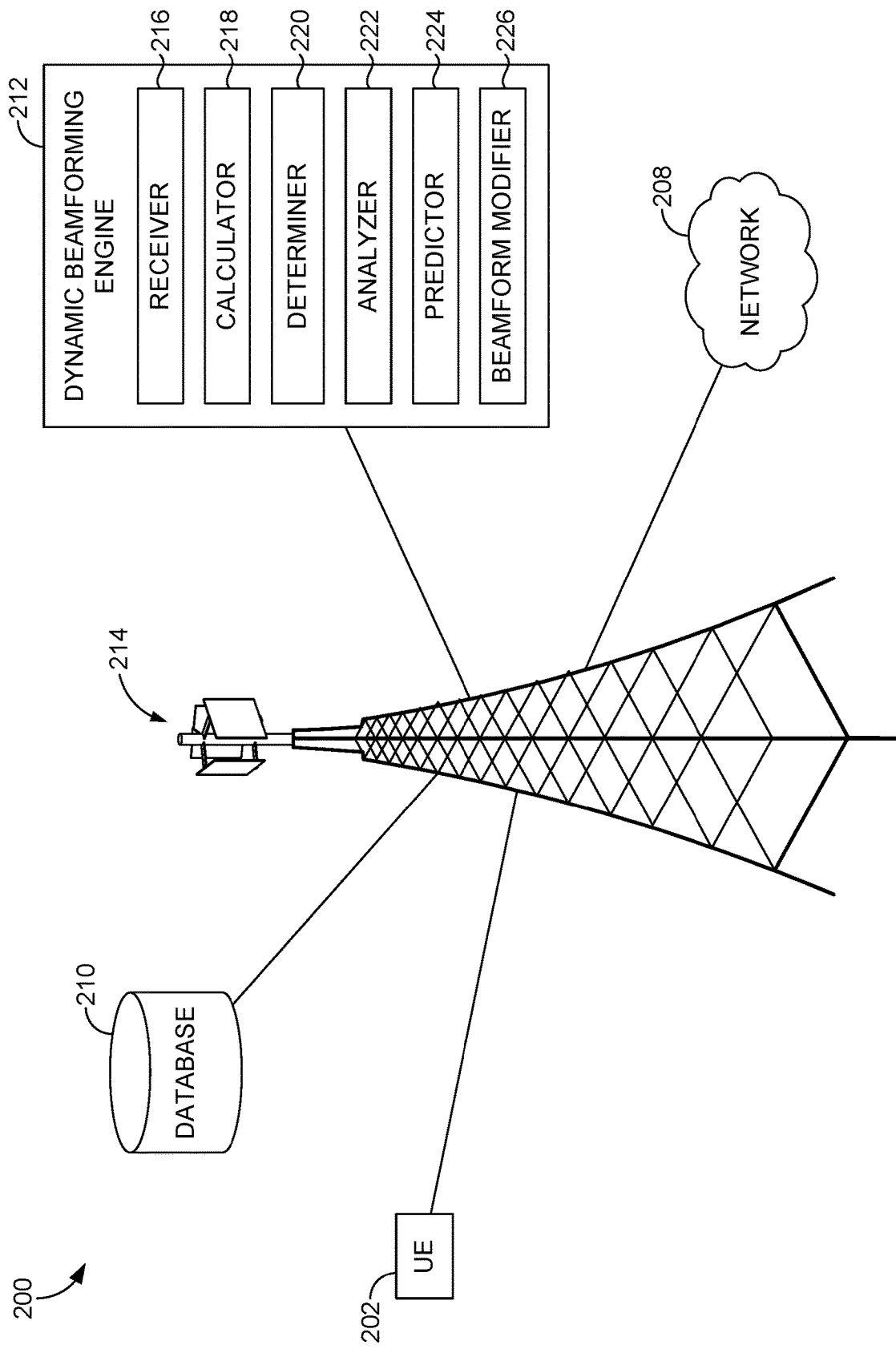
FIG. 2 illustrates a diagram of an exemplary network environment in which implementations of the present disclosure may be employed, in accordance with aspects herein.

Next, FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes a user device (UE) 202, access point 214 (which may be a cell site, base station, or the like), network 208, database 210, and dynamic beamforming engine 212. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the access point 214 in order to interact with a public or private network.

In some aspects, the UE 202 can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, a UE 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the UE 202 in network environment 200 can optionally utilize network 208 to communicate with other computing devices (e.g., a mobile device(s), a server(s), a personal computer(s), etc.) through cell site 214. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., LTE) to user devices, such as UE 202. For example, network 208 may provide voice, SMS, and/or data services to user devices or corresponding users that are registered or subscribed to utilize the services provided by a telecommunications provider. Network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, access point 214 is configured to communicate with a UE, such as UE 202, that is located within the geographical area, or cell, covered by radio antennas of cell site 214. Cell site or access point 214 may include one or more base stations, base transmitter stations, radios, antennas, antenna arrays, power amplifiers, transmitters/receivers, digital signal processors, control electronics, GPS equipment, and the like. In particular, access point 214 may selectively communicate with the user devices using dynamic beamforming.

As shown, access point 214 is in communication with dynamic beamforming engine 212, which comprises various components that are utilized, in various implementations, to perform one or more methods for dynamically improving UE beam effectiveness for a high mobility UE. In some implementations, dynamic beam forming engine 212 comprises components including a receiver 216, a calculator 218, a determiner 220, an analyzer 222, a predictor 224, and a beamform modifier 226. However, in other implementations, more or less components than those shown in FIG. 2 may be utilized to carry out aspects of the invention described herein.

The receiver 216 of the dynamic beam forming engine 212 receives a reference signal transmitted by the UE. Beamforming makes use of UE feedback that is sent on a sounding reference signal (SRS) to create UE specific beams. The SRS received by the receiver 216 is transmitted on the uplink and allows the network 208 to estimate the quality of the connection between the UE 202 and the access point 214.

The SRS is a reference signal for eNodeB to figure out the channel quality of uplink path for each subsection of frequency region. The UE 202 sends the SRS signal to the eNodeB for the formation of UE specific beams. However, as mentioned, user feedback is generally more reliable when a user is stationary or when signal variation is minimal. In the case of a high mobility UE, large Doppler shift values result. With high mobility UEs, the Doppler shift value increases as the mobility of the UE increases. The high mobility of a UE results in poor UE feedback and therefore decreased beamforming effectiveness.

UE feedback may include data sent from a UE such as location information of the user device and network parameters determined at or by the user device that includes information on how good or bad the communication channel quality is (SINR, pathloss, or the like) and the device power levels (maximum uplink powers and maximum total uplink power). Location information may be based on GPS or other satellite location services, terrestrial triangulation, an access point location, or any other means of obtaining coarse or fine location information. Additional data received by the receiver may include signal to noise ratio for one or more transitory signals communicated between the UE and the eNodeB. Network parameters may indicate a realized uplink and/or downlink transmission data rate, observed signal-to-interference-plus-noise ratio (SINR) and/or signal strength at the user device, path loss, or throughput of the connection. Location and/or network parameters may take into account the user device capability, such as the number of antennas and the type of receiver used for detection. Additionally, the data may also comprise path loss between the UE and the eNodeB and sector interference in a predetermined geographical region or location. Further, the receiver 216 may collect the UE feedback at predetermined time intervals throughout the day or continuously and any and all variations of collection intervals are contemplated herein.

The dynamic beam forming engine 212 further comprises a calculator 218. After the SRS is received by the receiver 216, the calculator 218 will calculate the at least one shift value for the UE 202 based on the received reference signal transmitted by the UE. The shift value calculated by the calculator 218 may be, but is not limited to, a Doppler shift value. In some aspects, the calculated shift value may be the speed or velocity at which the UE 202 is traveling. In other aspects, the calculator 218 may calculate a shift value that is determined based on a different measure of movement. As such, the shift value may be any value that results from a measure of the mobility of a UE 202.

A Doppler shift occurs when the transmitter 118 of a signal is moving in relation to a receiver and creates fading in a signal that is sent by the UE 202 to the access point 214. The relative movement of the UE 202 shifts the frequency of the signal, making it different at the access point 214 (e.g. receiver) than at the transmitter 118. Doppler shift is an apparent change in frequency (and, correspondingly, wavelength) due to the relative motion of two objects. For a Doppler radar system to measure speed, an accurate measurement of the original transmitted frequency and the reflected return frequency is required. The difference in the two frequencies is the termed the Doppler frequency shift, and is a direct indication of the object's speed. Fading occurs when attenuation appears unpredictably at undesired space and time coordinates. In other words, the signal is lower in amplitude at the receiver, which causes transmission problems. As such, high mobility UEs generally have a larger Doppler shift values as the difference between the transmitted frequency and the reflected return is larger for a UE that is moving at high speeds in comparison to a stationary UE. To further explain Doppler shift, consider the change of pitch heard when a train sounding a horn approaches and recedes from an observer. Compared to the emitted frequency, the received frequency is higher during the approach, identical at the instant of passing by, and lower during the recession. When the source of the waves is moving towards the observer, each successive wave is emitted from a position closer to the observer than the crest of the previous wave. Therefore, each wave takes slightly less time to reach the observer than the previous wave. Hence, the time between the arrival of successive wave crests at the observer is reduced, causing an increase in the frequency. While they are traveling, the distance between successive wave fronts is reduced, so the waves "bunch together". Conversely, if the source of waves is moving away from the observer, each wave is emitted from a position farther from the observer than the previous wave, so the arrival time between successive waves is increased, reducing the frequency. The distance between successive wave fronts is then increased, so the waves "spread out", thereby resulting in a larger Doppler shift value.

The determiner 220 is generally responsible for determining whether or not the at least one shift value for the UE 202 meets or exceeds a predetermined shift value threshold. In some aspects, the determiner 220 may also determine what the shift value threshold is. In aspects, the shift value threshold is an assigned specific Doppler shift value. In aspects, the determiner 220, via one or more of the gNodeB and eNodeB, determines whether the calculated shift value for the UE 202 is greater than the predetermined shift value for the UE 202. When a calculated shift value is found to be higher than the shift value threshold, that indicates that the beams ineffective and that the beam is likely not adequately covering the high mobility UE 202, thereby resulting in bad feedback and decreased performance of the UE and the Massive MIMO system. If the determiner 220 determines that the at least one shift value does not exceed the predetermined shift value threshold, then no further action will take place. In that case, there would not be a need to improve the beam effectiveness, as the at least one shift value or the Doppler shift value would be less than the predetermined threshold. This would mean that the UE 202 feedback was good and the beamforming effectiveness was satisfactory.

However, if the determiner 220 determines that the at least one shift value meets or exceeds the predetermined shift value threshold, it indicates that the shift calculated (e.g. Doppler shift value) is large, the UE feedback is poor, and that the beam is likely not effective or potentially covering the high mobility UE 202 as it moves.

Next, the analyzer 222 will analyze at least one past shift value for the UE 202. A past shift value may comprise a past Doppler shift value for the UE 202 or any other type of shift value that indicates a measurement of the UE 202's past movement. The past shift value analyzed by the analyzer 222 may be a past shift value calculated seconds, minutes, days or any time prior to the current moment. Analysis of the past shift values is valuable as it may predict the direction and speed of movement for the high mobility UE 202.

Additionally, the analyzer 222 may analyze more than one past shift value. For example, the analyzer 222 may, based on the specific UE, analyze multiple past shift values for that specific UE 202 based on its current location. If the location of the UE is one that occurs frequently, the analyzer 222 may have several prior shift values that were calculated by the calculator 218 to analyze. Additionally, the analyzer 222 may have data regarding the path of the UE 202, and if the UE 202 has previously taken the same path, may analyze one or more past shift values for the UE 202 along the same path. In other instances, the analyzer 222 may only have a single, past shift value, from immediately before the current moment to analyze.

Further, historical positions of the UE 202 may be analyzed to forecast likely positions of UE 202 and associated channel quality. Such forecasts may be different during the working hours of a business day, for example, than a Friday evening, which may yet be different than during a Sunday morning. Analyzed historical data and accompanying forecasts may be as granular as 7:30 am-7:31 am on a Monday morning (corresponding to Monday morning rush hour) or as broad as August-May (corresponding to an example of a school year).

After the analyzer 222 analyzes at least one past shift value for the UE 202, the predictor 224 will predict at least one future shift value for the UE 202. The future shift value for the UE 202 is based on the analysis completed by the analyzer 222. The future shift value may comprise a future Doppler shift value calculation and includes a prediction as to where the next location of the UE 202 will be. The prediction of the next location for the UE 202 may take place at any variety of intervals. For example, the analyzer 222 and predictor 224 may work to analyze past shift values and predict future shift values for each millisecond, second, minute, hour, or any time interval to predict the movement of UE 202.

Based on the predicted future shift value for the UE 202 by the predictor 224, the beamform modifier 226 will provide instructions to modify one or more of a first UE beam or a second UE beam. As will be discussed herein, a first beam may be considered a first beam in time; that is, the first beam is emitted by the cell site at a time prior to a time that a second beamform is emitted. As used herein, the term beamform or beam may be considered to be synonymous with a radiation pattern at a particular time. Radiation pattern, as used herein, may generally refer to the gain (dBi) of any one or more beamforms. The radiation pattern of any one or more beamforms may be considered to have a 3D shape in the x, y, z planes. The beamform modifier 226 may determine that the first beamform should be modified in any one or more of the x, y, and z planes in order to better serve the specific UE 202.

In some aspects, based on the predicted future shift value and analysis of the past shift values, the system may determine that the most effective way to improve beamforming effectiveness is to modify the first UE 202 beam. When it has been determined that the at least one shift value for the UE 202 meets or exceeds the predetermined shift value threshold, the first beam is not accurate and does not cover the UE 202. In other words, the UE 202 is outside the area of the first beam's reach, which leads to decreased effectiveness of the first beam. Therefore, based on the analysis and prediction of the future shift value, the system 200 may determine that the most efficient way to increase the beam effectiveness is to adjust the beamwidth of the first beam. In this case, the beamform modifier 226 will modify the beamwidth of the first beam so that it now covers UE 202 as it moves at high speeds. In some instances, this will result in the increase in the beamwidth of the first UE beam, while in other circumstances, the beamform modifier 226 may decrease the beamwidth of the first UE beam. In other aspects, the beamform modifier 226 may determine that a second UE beam should be created to cover the UE's 202 predicted shift value and future movement. In this case, the system 200 would create a second beam to cover the subsequent location of the UE 202.

Figure 3:
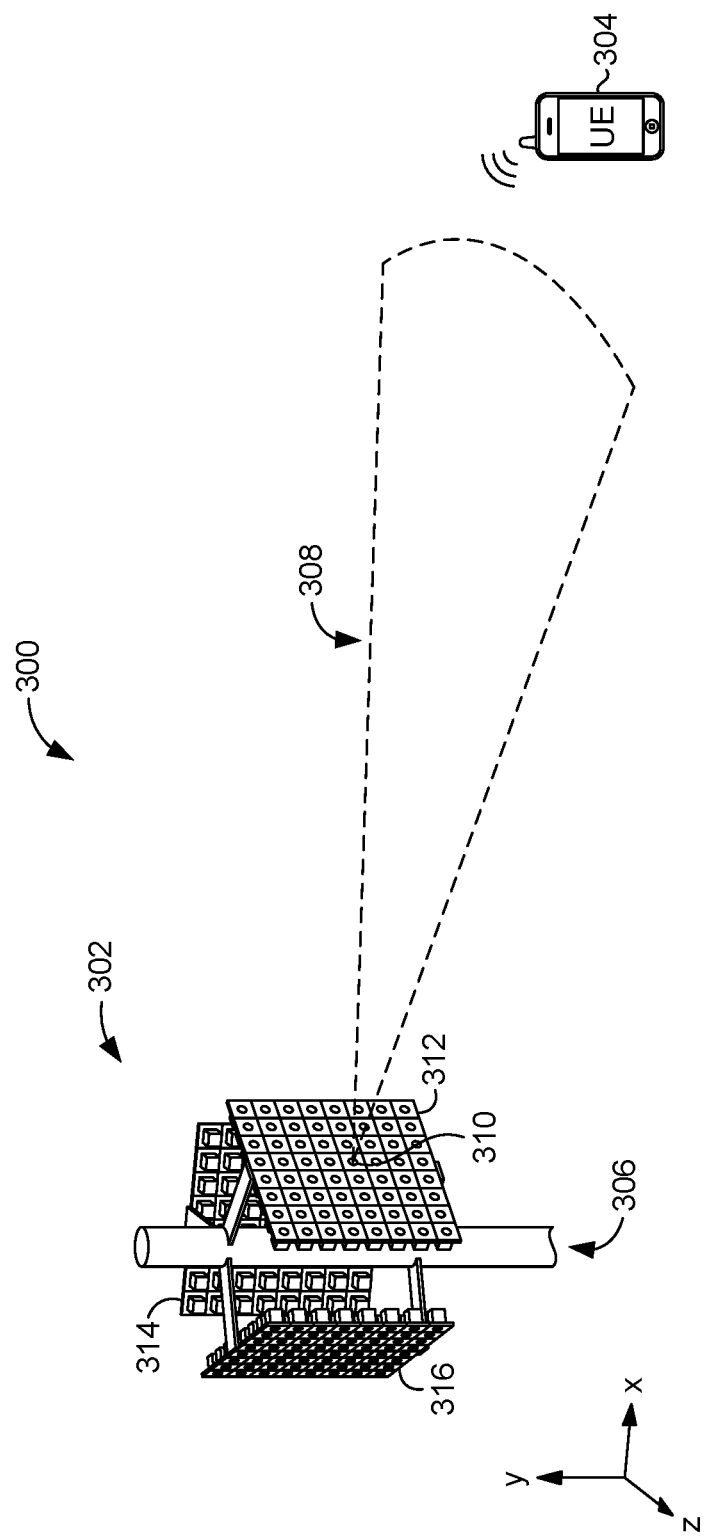
FIG. 3 illustrates a scenario where a first beam is not effective due to the high mobility of an exemplary user, in accordance with aspects herein.

Next, FIG. 3, illustrates the problem that occurs with the use of Massive MIMO and beamforming with high mobility UEs like UE 304. FIG. 3 illustrates one example of a suitable configuration and is not intended to suggest any limitations as to the scope of use or functionality of embodiments described herein. Neither should the configuration be interpreted as having any dependency or requirement relating to any one or combination of components illustrated. In FIG. 3, the system 300 comprises an access point 306, a beam 308, and UE 304. Access point 306 comprises a node 302 that is shown as a 5G or MIMO node. However, in other aspects, the node 302 may be a 4G or eNodeB node and the access point 306 may comprise more than one node. As used herein, the term node is used to refer to network access technology, such as eNode, gNode, etc. In other aspects, the term node may be used to refer to one or more antennas being used to communicate with the UE 304.

Additionally, in aspects, the node 302 comprises one or more antennas 312, 314, and 316. The one or more antennas may be dipole antennas, having a length, for example, of ¼, ½, 1, or 1½ wavelength. In aspects, the antenna array may be an active antenna array, FD-MIMO, Massive MIMO, 3G, 4G, 5G, and/or 802.11. While dipole antennas are referred to herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antennas of an antenna array may be broadly applicable to an antenna array comprising any type of antenna targeting any portion of the RF spectrum (though any lower than VHF may be size prohibitive).

As shown in FIG. 3, the node 302 comprises three antenna array 312, 314, and 316, each comprising 64 individual antennas 310 arranged in an 8×8 structure. In other aspects, the node 302 may comprise antennas arranged in an 8×4, 4×8, or 4×4 configuration. Each of the antenna array 312, 314, and 316 comprises a dedicated power supply (not shown). The power supply supplies power having a certain phase and amplitude to each antenna array 312, 314, and 316. In an embodiment, the power supply comprises a power amplifier and power controller. In other aspects, the power supply may additionally comprise a processor for making power supply determinations.

As shown, a beam 308 is created by individual antenna 310 located on antenna array 310. In this example, UE 304 is a high mobility user and traveling at high speeds. UE 304 is connected to a 5G wireless network supporting Massive MIMO. Based on feedback received from UE 304, a UE specific beam, beam 308 is assigned to UE 304. However, since the UE 304 is traveling at such high speeds, the channel conditions of the UE 304 will vary, leading to poor UE feedback. The poor feedback from a high mobility UE results in poor assignment of the UE beam, which then results in minimal performance improvement with Massive MIMO utilization or in some cases degradation.

Massive MIMO makes use of 3D beamforming to create narrow UE specific beams that have higher power and cause less interference with other UE specific beams present. As shown, Massive MIMO makes use of the large number of individual antennas found on antennas arrays 312, 314, and 316, which allowing for an increased capacity by being able to create significantly more rays than prior antennas. However, it is difficult to get good UE feedback with a high mobility user such as UE 304. As shown in FIG. 3, UE beam 308 is too narrow and does not cover UE 304. When this occurs, it decreases the utility of the use of Massive MIMO and the feedback may be unreliable. The poor feedback results in decreasing the beamforming effectiveness. This example presents the challenge with high mobility UEs utilizing Massive MIMO that the present disclosure resolves through predictive beamforming based on past shift values to create either a new UE specific beam or to adjust the beamwidth of the existing UE beam 308, which will be further described in FIGS. 4A-5B.

Figure 4A:
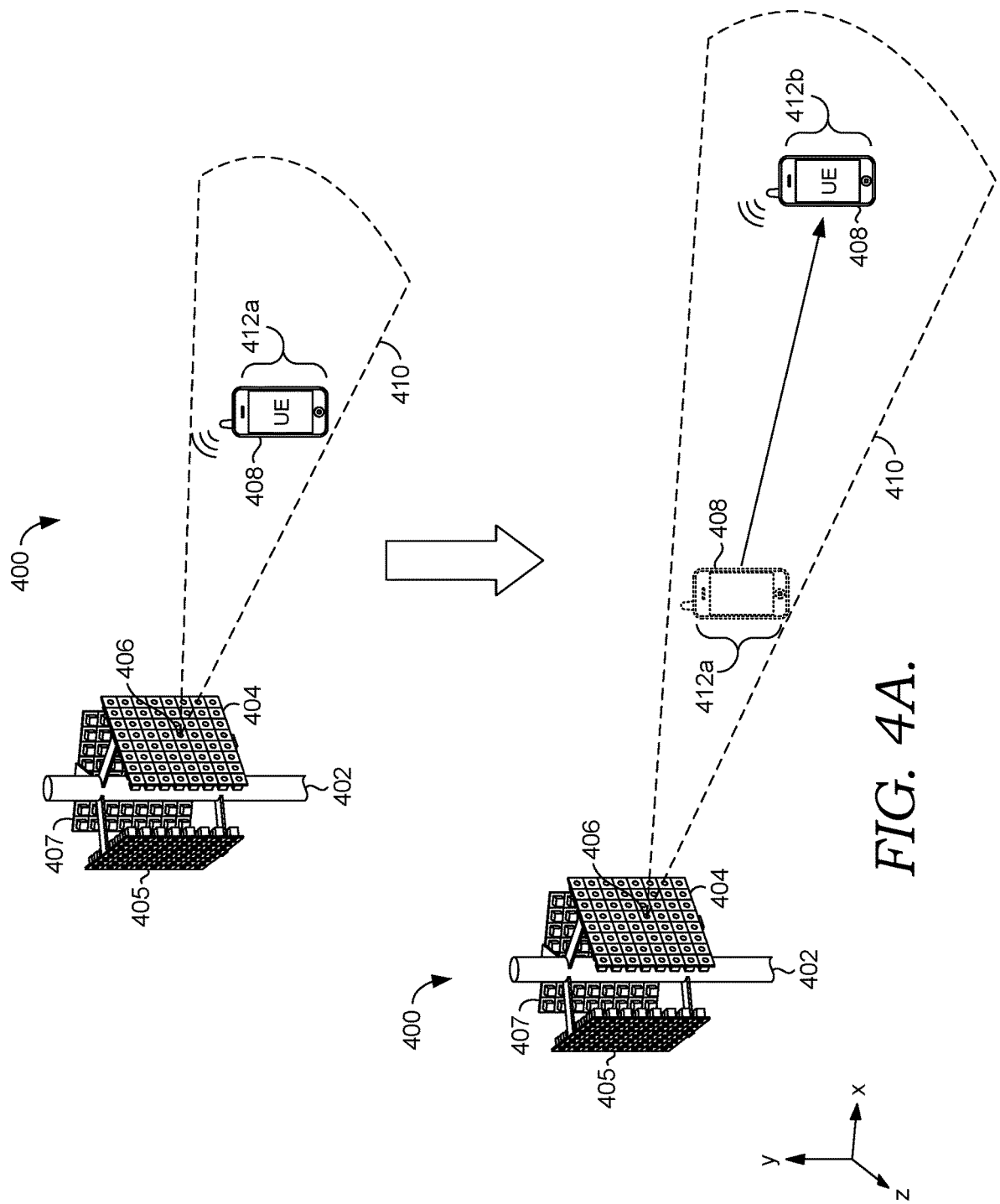
FIG. 4A depicts the use of predictive beamforming to adjust a beamwidth of the UE beamform in a first direction to cover the highly mobile UE, in accordance with aspects herein.
Figure 4B:
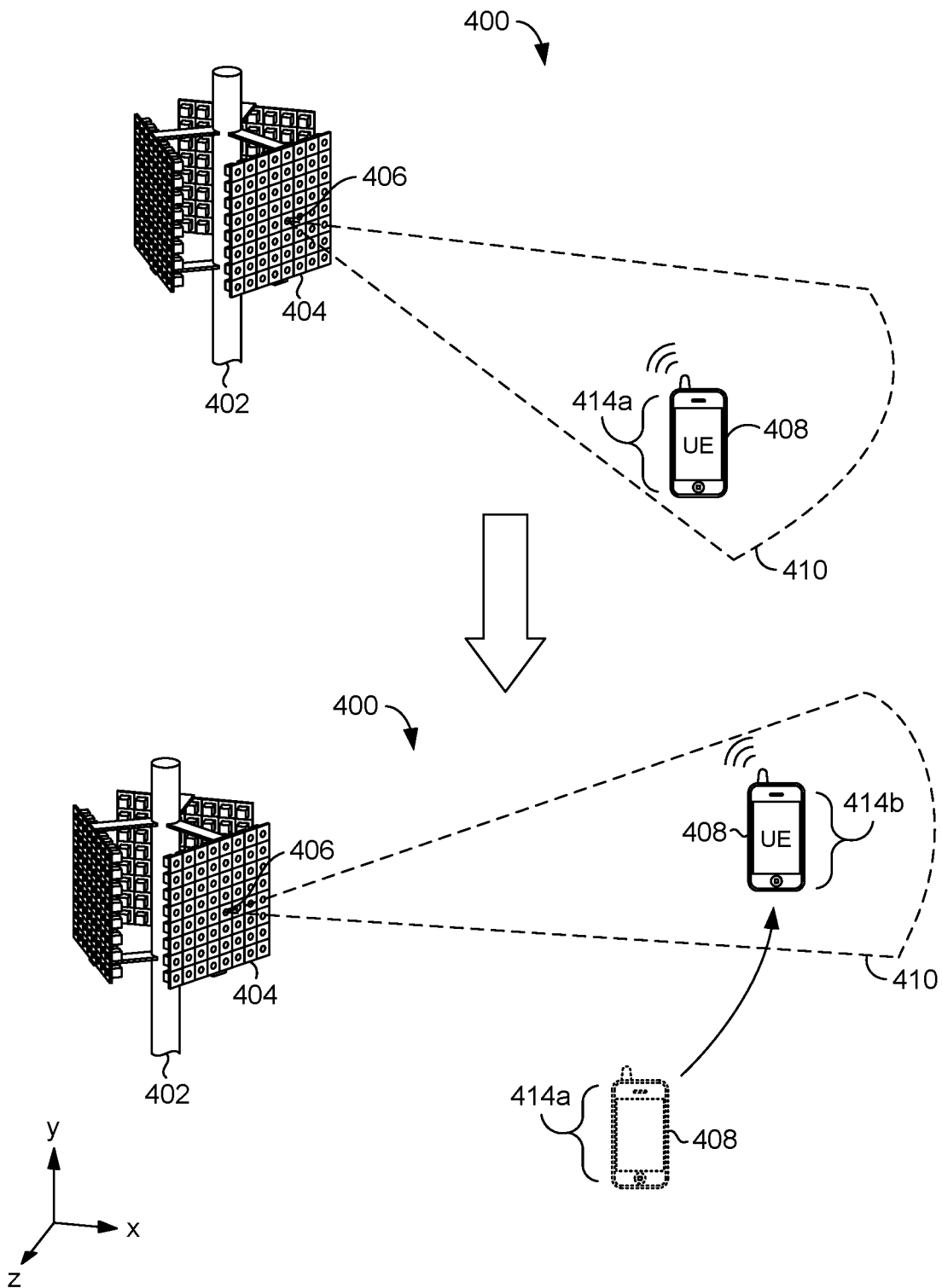
FIG. 4B depicts the use of predictive beamforming to adjust a beamwidth of the UE beamform in a second direction to cover the highly mobile UE, in accordance with aspects herein.

FIGS. 4A and 4B illustrate one way predictive beamforming based on past shift values is used to resolve the effectiveness issue that arises with Massive MIMO systems and high mobility UEs. As shown, the system 400 of FIGS. 4A and 4B comprise an access point 402, antenna arrays 404, 405, and 407, UE 408, and a first UE beam 410. In the top image of FIG. 4A, the first beam 408 from antenna ray 406 covers the UE 408. Upon receiving feedback at the access point 402, the components of the dynamic beamforming engine 212 utilize predictive beamforming to adjust the beamwidth of the first beam 410 to so that it covers the high mobility UE 408 as it moves to its next location.

Prior to adjusting the beamwidth, the calculator 218 calculated at least one shift value for high mobility UE 408. For exemplary purposes, the calculated at least one shift value for high mobility UE 408 is a Doppler shift value, but as mentioned, the shift value may be a speed, velocity or some other measure of the UE 408's movement. The calculator 218, utilizing a Doppler shift algorithm, calculated at least one Doppler shift value for UE 408 based on a received reference signal transmitted by UE 408 to the antenna ray 406. As an example, the calculator 218 may calculate the Doppler shift value for UE 408 to be 100 MHz. Then, the determiner 220 determines whether the 100 MHz Doppler shift value is greater than a predetermined shift value threshold for UE 408. As such, if the shift value threshold for UE 408 is 75 MHz, then the determiner 220 will determine that the at least one shift value for UE 408 of 100 MHz exceeds the predetermined shift value threshold. Upon making this determination, the analyzer 222 will analyze at least one past shift value for UE 408. In this case, the at least one past shift value analyzed for UE 408 may be shift values calculated immediately prior to the current moment or may be from earlier (e.g. hours prior, days prior, etc.).

Additionally, the analyzer 222 may analyze more than one past shift value for UE 408. The analyzer 222 may utilize any and all past shift values that were previously calculated by the calculator 218. The past shift values for each UE are stored at the access point 402 and retrieved by the dynamic beamforming engine 212. In some aspects, the analyzer 222 may retrieve the at least one past shift value for UE 408. In other aspects, other components of the dynamic beam forming engine, such as the receiver 216, may also retrieve such information for analysis by the analyzer 222. Then, based on the analysis of the at least one past shift value for UE 408, the predictor 224 will predict at least one future shift value for UE 408. In this instance, the predictor 224 will predict at least one future shift value for UE 408 that corresponds to the next potential location of the UE 408. In the bottom image of FIG. 4A, the predictor 224 has predicted that the UE 408 will move longitudinally from the first location 412a (shown in dotted lines) to a second location 412b. The beamform modifier 226 has modified the first beam 410's beamwidth so that first beam 410 will be able to cover the UE 408 if it moves, as shown, from the first location 412a to a second location 412b based on the predicted Doppler shift value. As shown, the UE 408 has moved longitudinally from location 412a to 412b. By utilizing predicative beamforming based on the analysis of UE 408's past Doppler shift values, the system 400 is able to resolve the poor feedback and ineffective beamforming that previously occurred with high mobility UEs like UE 408 by predicting the next location of the high mobility UE 408 and adjusting the beamwidth of the first beam 410 so that it will cover the UE 408 as it moves. As a result, the feedback sent over the SRS will be more effective, overall UE feedback will be better, and the beamforming will be more effective since the beam 410 will accurately cover the high mobility UE 408's movements through the prediction of the future shift value. This in turn results in improvement with the use of Massive MIMO with a high mobility user like user 408 and improves the performance of the UE.

FIG. 4B also illustrates the system 400 adjusting the beamwidth of the first beam 410 based on the predicted future shift value for UE 408. FIG. 4b is shown to illustrate how the UE 408 may move in a rotational direction instead of longitudinally as shown in FIG. 4A, and shows the modification by the beamform modifier 226 by adjusting the beamwidth and location of the beam to ensure that the first beam 410 will cover the UE 408's next movement based on the predicted future shift value. In FIG. 4B, instead of the UE 408 moving further away from access point 402 longitudinally, UE 408's movement is in a rotational direction, moving upward. In this example, the analyzer 222 may analyze the same or different at least one past shift values for the UE 408. In some instances, the analyzer 222 may analyze past shift values that relate to rotational movement of the UE 408 or the analyzer 222 may analyze any and all available past shift values so that the predictor can utilize all of the past shift values for UE 408 to predict the at least one future shift value and future movement of the UE 408. In this example, the predictor 224 has predicted that the UE 408 will move upward in a rotational direction from position 414a (shown in dotted lines in the lower image of FIG. 4B) to position 414b. Based on this prediction, the modifier adjusted the beamwidth of the first beam 410 so that the beam's direction and location would cover the UE 408 as it moved rotationally upward from position 414a to 414b. As described in FIG. 4A, by adjusting the beamwidth of the first beam 410, the first beam 410 is able to cover high mobility UE 408 as it has moved based upon the predicted future shift value (e.g. Doppler shift value) of the UE 408 by the predictor, which allows for more beam effectiveness and improved performance/feedback from the UE.

Figure 5A:
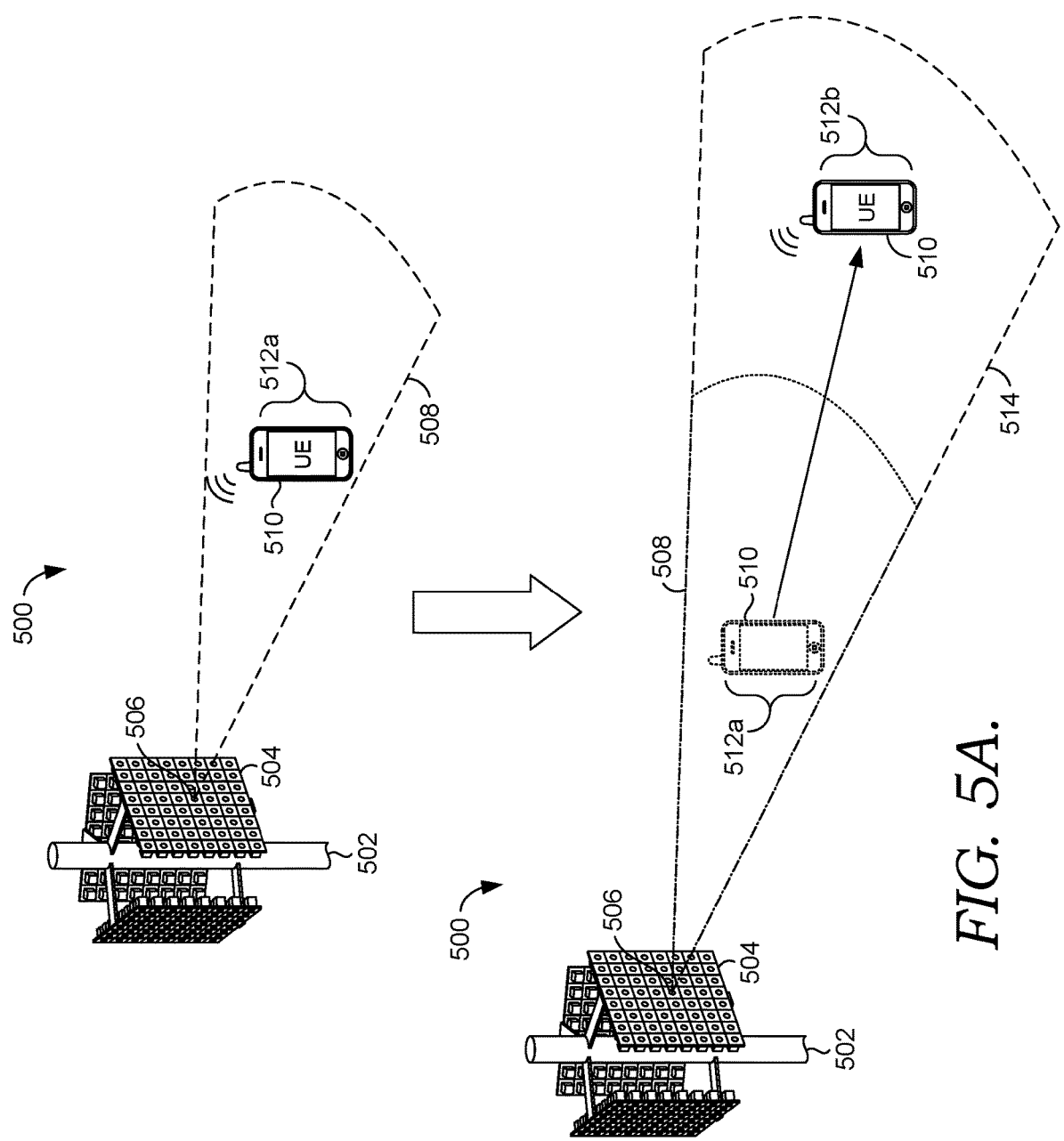
FIG. 5A depicts the use of predictive beamforming to create a second UE beamform in a first direction to cover highly mobile UE, in accordance with aspects herein.
Figure 5B:
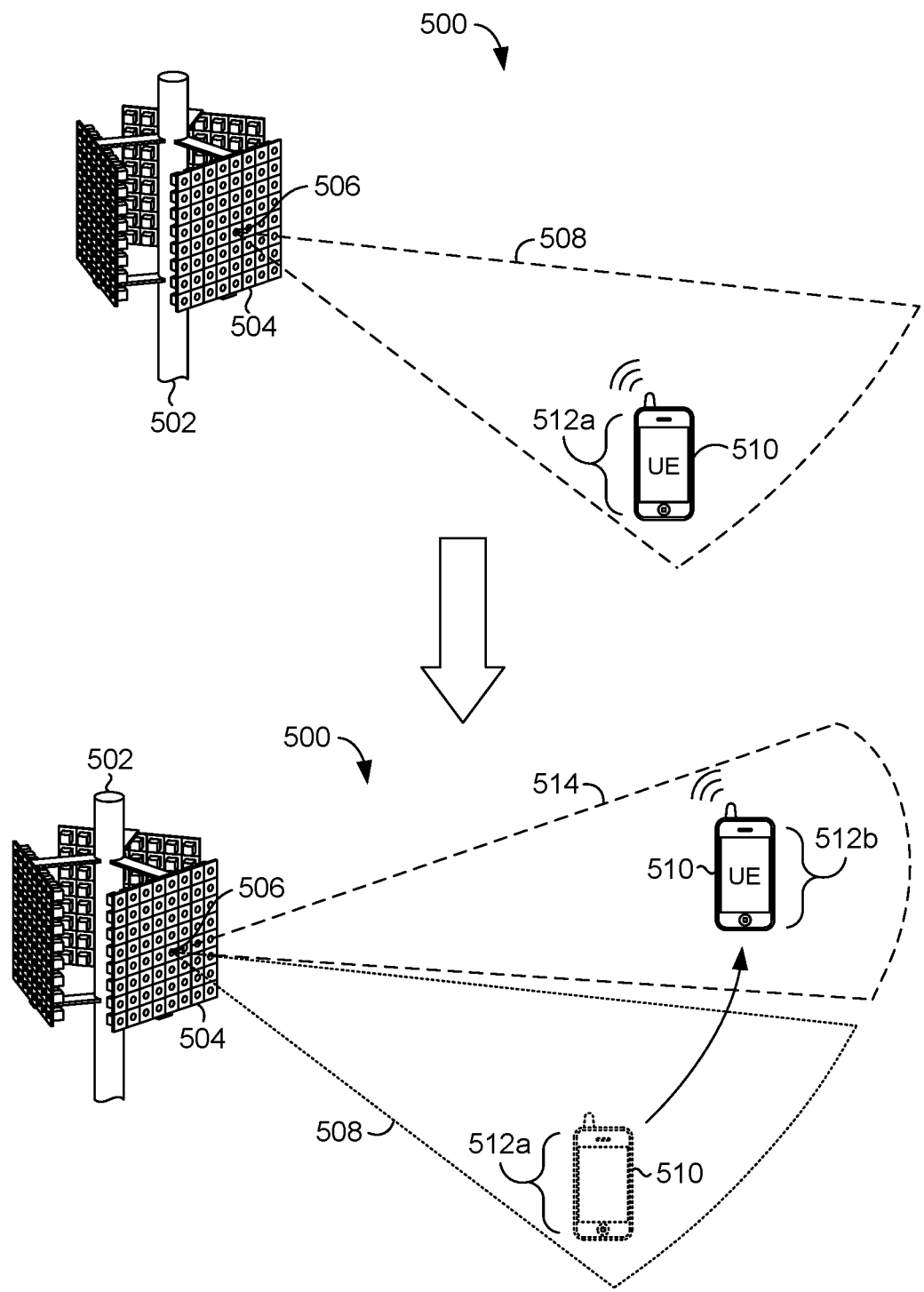
FIG. 5B depicts the use of predictive beamforming to create a second UE beamform in a second direction to cover highly mobile UE, in accordance with aspects herein.

Next, FIGS. 5A and 5B illustrate how the beamform modifier 226 may instead modify a second beam after predictor 224 predicts the at least one future shift value. As shown in FIGS. 5A and 5B, the modification of the second beam comprises generating a new UE specific beam 514 to cover UE 510 in a predicted future location based on the predicted at least one future shift value. In this aspect, rather than adjusting the beamwidth of the first beam 508 to cover the movement of the high mobility UE 510, the dynamic beamforming engine 212, via the beamform modifier 226, has decided to create a second beam 514 in order to cover the UE 510's movement. As shown in FIG. 5A, the UE 510 has moved from the first position 512a to a second position 512b. Based on the prediction of the at least one future shift value by the predictor 224, the beamform modifier is able to create a second, specific beam for UE 510 in order to cover the UE as it moves longitudinally from the first location 512a to the second location 512b. Once again, this will greatly improve the performance of the UE 512 and make the utilization of the Massive MIMO system more effective.

Next, FIG. 5B, illustrates yet another aspect in which the system 500 has utilized predictive beamforming to create a second beam to cover the high mobility user 510 as it moves from one location to the next. As previously described, the various components of the dynamic beamforming engine 212 have completed their respective tasks of calculating at least one shift value for the UE 510, determining that the UE 510's at least one shift value meets or exceeds the predetermined shift value threshold, analyzing at least one past shift value for UE 510, predicting at least on future shift value for UE 510 based on the analysis of the at least one past shift value of UE 510, and providing instructions to the beamform modifier 226 to create a second beam 514 to cover the UE 510 as it has moved based on the predicted shift value. However, similar to FIG. 4B, FIG. 5b illustrates how the beamforming will be adapted if the UE 510's movement is rotational rather than longitudinal. As such, when the beamform modifier 226 creates the second beam 514, the second beam 514 is created in a rotational direction so that it captures the UE 520's movement from location 512a to location 512b as shown the bottom image of FIG. 5B. Once again, this allows the first UE beam 508 and the second UE beam 514 to cover the UE 510 if moves based on the future shift value predicted by predictor 224. As such, this leads to improvement of the UE performance, good UE feedback, and more efficient use of the Massive MIMO system. While FIGS. 4A-5B illustrate the modification of a firm beam by adjusting the beamwidth of the first beam and generating a second beam to cover movement of a UE based on future shift values calculated, it is contemplated that the dynamic beamforming engine, through its various components, may determine additional modifications of a first beam and a second beam in order to cover a high mobility UE based on the shift values for that UE.

Figure 6:
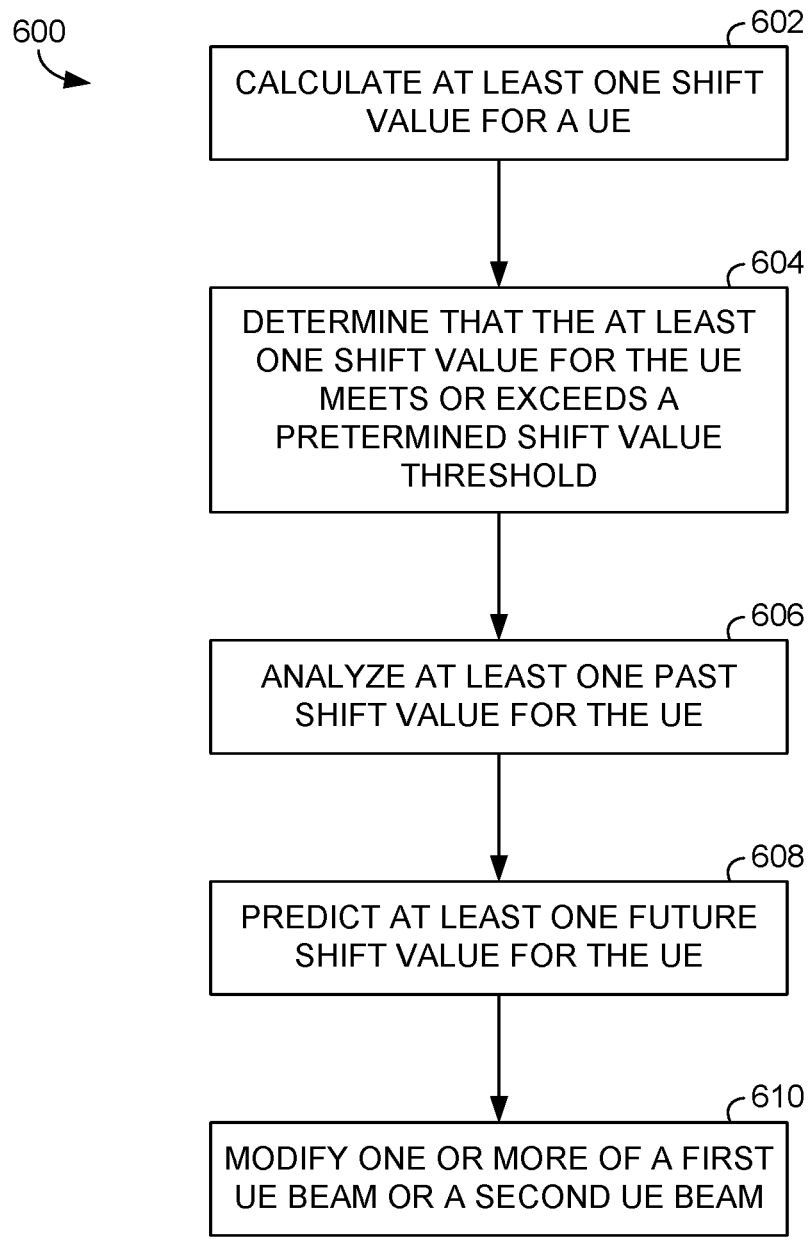
FIG. 6 depicts a flow diagram of an exemplary method for dynamically improving UE beam effectiveness for a highly mobile UE, in accordance with aspects herein.

Turning to FIG. 6, which depicts a flow diagram of an exemplary method 600 for improving UE beam effectiveness for a high mobility user, in accordance with aspects herein. Initially, at block 602, at least one shift value for a UE is calculated. As previously mentioned, the calculator 218 will calculate the at least one shift value, which may be a Doppler shift value, speed of the UE, velocity of the UE, or any other value that is a measurement of the movement of the UE. While not shown, in some aspects, prior to block 602, the method may also utilize a receiver 214 to receive data, such as the GPS location the UE, signal channel quality, and other components of UE feedback (e.g. SINR, pathloss, etc.) that may factor in to the process of improving the UE's beamforming effectiveness. Additionally, the receiver 216 may receive data necessary to make the calculation of the at least one shift value at block 602. The calculator 218 may calculate one or more shift values for the UE.

Next, at block 604, the determiner 220 will determine that the at least one shift value calculated by the calculator 218 meets or exceeds a predetermined shift value threshold. The predetermined shift value threshold may be determined by the calculator 218, determiner 220 or any other component of the dynamic beamforming engine 212. In some instances, if the calculated at least one shift value for the UE is equal to the predetermined shift value threshold, the beam forming engine 212 may take no further action. In other words, it may be determined by the determiner 220 that when the calculated shift value for a UE is equal to the predetermined shift threshold, none of the subsequent actions of analyzing of past shift values of the UE, prediction of a future shift value for the UE, and modification of a first UE beam or a second UE beam is needed. In this instance, the result would be the conclusion that the current UE beam is adequately covering the UE, the current beam should be able to cover any subsequent movement of the UE, and the beamforming effectiveness is satisfactory for the UE. This would also mean that the UE feedback and performance were adequate. In other aspects, when the at least one shift value for the UE is equal to the predetermined shift value threshold, the dynamic beamforming engine 212 may find this unsatisfactory and proceed with the subsequent steps in the method 600.

As such, in aspects, as a result of determining that the at least one shift value for the UE meets or exceeds the predetermined shift value threshold, the analyzer 222 will analyze at least one past shift value for the UE at step 606. As discussed herein, the at least one past shift value may be shift value from any period of time prior to the current moment. For example, the system may generally store each shift value for a UE at the access point or base station. Shift values for the UE may be calculated by the calculator at various predetermined times or intervals. In some aspects, the system may have the calculator calculate shift values for each movement of the UE. In other aspects, the shift value may be calculated periodically at intervals throughout the day (e.g. every 5 seconds, once an hour, etc.).

After analyzing the at least one past shift value for the UE at block 606, the predictor 224 will predict at least one future shift value for the UE at 608. Once again, the future shift value may be a Doppler shift value, future velocity, future speed of the UE, or any measurement that indicates the future movement of the UE. Additionally, the predictor 224 may predict more than one future shift value for the UE at step 608. Predicting more than one future shift value may allow the system to predict multiple subsequent movements of the UE or may allow the system to prepare for various potential locations of the next movement of the UE. For example, the predictor 224 may predict more than one future shift value for various directions of movement by the UE based on the analysis of the past shift values at step 606. This prediction would allow the beamform modifier 226 to be ready to modify the first or second beam in a variety of directions to cover the UE's movement. In other situations, the predictor 224 may utilize the analysis of more than one past shift values at step 606 to predict more than one future movement of the UE so that any modification of a first or second UE beam will cover the UE for more than one subsequent movement, leading do a better UE performance, better UE feedback, and more effective and efficient use of the Massive MIMO system.

Once the at least one future shift values have been predicted, the beamform modifier 226 will modify one or more of the first UE beam or the second UE beam as previously illustrated in FIGS. 4A-5B at step 610. The beamform modifier 226 may adjust the beamwidth of the first beam to cover movement of the UE based on the shift value calculations, thereby allowing the first beam to cover the UE in the future. In other instances, the beamform modifier 22 may create a second UE beam to cover the subsequent UE movement based on the predicted shift value. The determination of which modification to make by the beamform modifier 226 may be based on a variety of factors and data including, but not limited to, the state and characteristics of the Massive MIMO system, capacity of the Massive MIMO system, number of other UEs in a given area, beamforming capacity of an antenna ray, etc.

Additionally, the predicted shift value of the UE may also impact whether the first beam's beamwidth is adjusted by the beamform modifier or whether a second beam is created. For example, if the future shift value of the UE is determined to be a value that indicates that the UE will move rotationally next, the beamform modifier may determine that the most effective use of the Massive MIMO system with the high mobility UE would be to create a new, second beam. This may be determined because, for example, adjusting a first beam's beamwidth to encompass the rotational movement of the high mobility UE may result in decreasing the effectiveness of the beamforming or utilizing too much capacity of the Massive MIMO system. In other circumstances, the beamform modifier 226 may determine the most effective and efficient way to cover the UE's subsequent movement to result in good feedback and improved UE performance, is to adjust the beamwidth of the first beam to cover the subsequent movement of the UE. In method 600, the modification of the first UE beam or the second UE beam is based on the UE's direction of movement.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for dynamically improving user equipment (UE) beam effectiveness for a high mobility UE, the system comprising:
   one or more processors; and
   one or more computer storage hardware devices storing computer-usable instructions that, when used by the one or more processors, cause the one or more processors to:
   calculate at least one shift value for the UE based on a received reference signal transmitted by the UE;
   determine that the at least one shift value for the UE meets or exceeds a predetermined shift value threshold;

in response to determining that the at least one shift value for the UE meets or exceeds the predetermined shift value threshold:
analyze at least one past shift value for the UE;
predict at least one future shift value for the UE based on the at least one past shift value for the UE; and
provide instructions to modify one or more of a first UE beam or a second UE beam.

2. The system of claim 1, wherein the at least one shift value for the UE is a Doppler shift value.

3. The system of claim 1, wherein the at least one shift value for the UE is a measurement of movement of the UE.

4. The system of claim 1, wherein the reference signal is a sounding reference signal (SRS) transmitted by the UE in an uplink direction.

5. The system of claim 4, wherein the shift value is received on the SRS using one or more of a gNodeB or an eNodeB.

6. The system of claim 5, wherein one or more of the gNodeB and eNodeB determine whether the shift value is greater than the predetermined shift value threshold.

7. The system of claim 6, wherein the one or more of the gNodeB and eNodeB utilize an algorithm to predict a Doppler shift value of the UE based on the at least one past shift value.

8. The system of claim 1, wherein the modification of the first beam comprises increasing a beamwidth of the first beam so that the first beam covers the UE if the UE moves based on the predicted future shift value.

9. The system of claim 1, wherein the modification of the second UE beam comprises generating a new UE beam in addition to the existing first UE beam to cover the UE if the UE moves based on the predicted future shift value.

10. The system of claim 1, wherein the first UE beam and the second UE beam are further modified based on UE feedback received via the reference signal.

11. The system of claim 1, wherein predicting at least one future shift value comprises predicting a Doppler shift value that corresponds to movement of the UE.

12. The system of claim 1, wherein the modification of the first UE beam or the second UE beam is also based on the UE's direction of movement.

13. A method for dynamically improving user equipment (UE) beam effectiveness for a high mobility UE, the method comprising:
calculating at least one shift value for the UE based on a received reference signal transmitted by the UE;
determining that the at least one shift value for the UE meets or exceeds a predetermined shift value threshold;
in response to determining that the at least one shift value for the UE meets or exceeds the predetermined shift value threshold:
analyzing at least one past shift value for the UE;
predicting at least one future shift value for the UE based on the at least one past shift value for the UE; and
providing instructions to modify one or more of a first UE beam or a second UE beam.

14. The method of claim 13, wherein the method further predicts a subsequent location for the UE.

15. The method of claim 14, wherein the modification of the first UE beam comprises modifying a beamwidth of the first UE beam to cover the UE at a predicted subsequent location.

16. The method of claim 14, wherein the modification of the second UE beam comprises generating a new UE specific beam to cover the UE at the predicted subsequent location.

17. The method of claim 13, wherein the modification of the first UE beam or the second UE beam is based on the UE's direction of movement.

18. A non-transitory computer storage media storing computer-usable instructions that, when used by one or more processors, cause the one or more processors to:
calculate at least one Doppler shift value for a user equipment (UE) based on a received reference signal transmitted by the UE;
determine that the at least one Doppler shift value for the UE meets or exceeds a predetermined Doppler shift value threshold;
in response to determining that the at least one Doppler shift value for the UE meets or exceeds the predetermined Doppler shift value threshold:
analyze at least one past Doppler shift value for the UE;
predict at least one future Doppler shift value for the UE based on the at least one past Doppler shift value for the UE; and
provide instructions to modify one or more of a first UE beam or a second UE beam.

19. The non-transitory computer store media of claim 18, wherein the Doppler shift value for a high mobility user is greater than a stationary user.

20. The non-transitory computer store media of claim 18, wherein the Doppler shift value increases as the mobility of the user increases.

* * * * *